(12) United States Patent
Hanscom (10) Patent No.: US 7,789,425 B2
(45) Date of Patent: Sep. 7, 2010

(54) TRAILER STABILIZING DEVICE AND METHOD OF USING SAME

(76) Inventor: Paul Hanscom, 9609 Lake Pyramid Ct., Bakersfiled, CA (US) 93312

( * ) Notice: Subject to any disclaimer, the term of this patent is extended or adjusted under 35 U.S.C. 154(b) by 557 days.

(21) Appl. No.: 11/588,662

(22) Filed: Oct. 26, 2006

(65) Prior Publication Data

US 2007/0040370 A1   Feb. 22, 2007

Related U.S. Application Data (63) Continuation-in-part of application No. 10/899,921, filed on Jul. 26, 2004, now Pat. No. 7,338,052.

(51) Int. Cl.
*B60S 9/04* (2006.01)
(52) U.S. Cl. .................................. 280/763.1
(58) Field of Classification Search ............. 280/763.1, 280/764.1, 766.1, 765.1, 6.153, 35; 248/351, 248/352, 354.1, 354.3, 354.4, 354.5, 354.6; 254/418, 419, 423, 424, 426, 427; 52/169.12
See application file for complete search history.

(56) References Cited

U.S. PATENT DOCUMENTS

| | | | | |
|---|---|---|---|---|
| 1,445,239 | A * | 2/1923 | Reddig | 248/646 |
| 1,488,406 | A * | 3/1924 | Morrison | 254/419 |
| 2,361,690 | A | 10/1944 | Hunz | 254/110 |
| 2,571,067 | A | 10/1951 | Seckenkdorf | 254/133 R |
| 2,572,410 | A | 10/1951 | Van Doorne | 280/763.1 |
| 2,926,889 | A | 3/1960 | Obes | 254/419 |
| 2,942,676 | A * | 6/1960 | Kraus | 180/8.5 |
| 3,096,065 | A | 7/1963 | Horn | 248/354.3 |
| 3,169,012 | A | 2/1965 | Fagan | 254/419 |
| 3,281,160 | A | 10/1966 | Vinther et al. | 254/420 |
| 3,322,392 | A * | 5/1967 | Hoffman | 254/47 |
| 3,367,614 | A * | 2/1968 | Leonard | 254/101 |
| 3,471,168 | A * | 10/1969 | Lotesto et al. | 280/767 |
| 3,475,008 | A * | 10/1969 | Taylor | 254/424 |
| 3,536,337 | A | 10/1970 | Molnar | 282/764.1 |
| 3,537,724 | A * | 11/1970 | Matthews | 280/763.1 |
| 3,656,778 | A | 4/1972 | Bristol | 280/763.1 |

(Continued)

*Primary Examiner*—Paul N Dickson
*Assistant Examiner*—Karen Jane J Amores
(74) *Attorney, Agent, or Firm*—Burns & Levinson LLP; Jacob N. Erlich; Yakov M. Korkhin (57) ABSTRACT

An apparatus for stabilizing a stationary trailer comprises a adjustable length leg member, which may comprise the jack stands or landing gear which come as originally installed equipment on the trailer. Alternatively, the adjustable length leg members may comprise various types of jacks which are later attached to the bottom of the trailer. The apparatus further comprises a ground engaging base plate which is attached to the end of the adjustable length leg member. The ground engaging base plate comprises attachment means for one or more stabilizer members. The first end of the stabilizing member attaches to the ground engaging base plate and the second end of the stabilizing member attaches to an attachment member depending from the bottom of the trailer. The attachment member is adapted to slidably receive the second end of the stabilizing member. The attachment member comprises locking means for engaging the stabilizing member and locking the stabilizing member with respect to the attachment member. The locking means allows the length of the stabilizing member disposed between the ground engaging base plate and the attachment member to be adjusted and locked as desired to increase the stability of the trailer.

36 Claims, 10 Drawing Sheets

U.S. PATENT DOCUMENTS

| | | | | |
|---|---|---|---|---|
| 3,690,694 | A | 9/1972 | Herndon et al | 280/763.1 |
| 3,741,586 | A * | 6/1973 | Wiczer | 280/764.1 |
| 3,782,749 | A * | 1/1974 | Wiczer | 280/641 |
| 3,791,676 | A | 2/1974 | Spratlen | 280/475 |
| 3,823,958 | A | 7/1974 | Trejbal | |
| 3,836,173 | A | 9/1974 | Schwaiger | 280/763.1 |
| 3,874,696 | A | 4/1975 | Gardner et al. | 254/419 |
| 3,933,372 | A | 1/1976 | Herndon | 280/763.1 |
| 4,097,840 | A | 6/1978 | Chappelle | 340/431 |
| 4,218,094 | A | 8/1980 | Leaver | 298/17 B |
| 4,268,066 | A | 5/1981 | Davis | 280/763.1 |
| 4,340,100 | A | 7/1982 | Anderson, II | 269/41 |
| 4,429,851 | A | 2/1984 | DeJager | 248/354.5 |
| 4,562,673 | A | 1/1986 | Barari | 52/167.1 |
| 4,589,632 | A * | 5/1986 | Smith | 254/418 |
| 4,596,196 | A | 6/1986 | Gunter et al. | 108/169 |
| 4,611,948 | A | 9/1986 | Johnson | 403/232.1 |
| 4,708,362 | A | 11/1987 | Raetz | |
| 4,997,203 | A | 3/1991 | Jensen | 280/763.1 |
| 5,042,779 | A * | 8/1991 | Eden | 254/424 |
| 5,111,632 | A | 5/1992 | Turner | 52/702 |
| 5,137,297 | A | 8/1992 | Walker | 280/414.5 |
| 5,205,586 | A | 4/1993 | Tallman | 280/764.1 |
| 5,217,209 | A | 6/1993 | Anders | 254/419 |
| 5,224,688 | A * | 7/1993 | Torres et al. | 254/423 |
| 5,271,596 | A * | 12/1993 | Holcomb et al. | 249/24 |
| 5,348,330 | A | 9/1994 | Few et al. | 280/475 |
| 5,405,160 | A | 4/1995 | Weaver | |
| 5,409,251 | A | 4/1995 | Thorndyke | 280/475 |
| 5,423,518 | A | 6/1995 | Baxter et al. | |
| 5,451,076 | A * | 9/1995 | Burkhead | 280/766.1 |
| 5,474,330 | A | 12/1995 | Meehleder | 280/763.1 |
| 5,509,687 | A | 4/1996 | Thorndyke | 280/766.1 |
| 5,527,054 | A | 6/1996 | Williams | 280/475 |
| 5,575,492 | A * | 11/1996 | Stone | 280/475 |
| 5,575,493 | A | 11/1996 | Schwartz et al. | 280/475 |
| 5,901,980 | A * | 5/1999 | Few et al. | 280/763.1 |
| 5,984,342 | A | 11/1999 | Ysker | 280/492 |
| 6,062,524 | A | 5/2000 | Jackson, Sr. | 248/252 |
| 6,095,474 | A | 8/2000 | Arnold | 248/352 |
| 6,139,056 | A | 10/2000 | Sourdeau | 280/763.1 |
| 6,142,488 | A | 11/2000 | Orr | 280/6.153 |
| 6,309,165 | B1 | 10/2001 | Hahn et al. | 414/401.1 |
| 6,331,016 | B1 | 12/2001 | Wallace et al. | |
| 6,443,413 | B1 * | 9/2002 | Hawkins et al. | 248/352 |
| 6,494,487 | B1 | 12/2002 | Nebel | 280/765.1 |
| 6,629,701 | B1 | 10/2003 | Colibert | 280/455.1 |
| 6,695,348 | B2 * | 2/2004 | Holly | 280/763.1 |
| 6,726,236 | B2 | 4/2004 | Cofer | 280/475 |
| 6,726,247 | B1 * | 4/2004 | Snyder | 280/766.1 |
| 6,893,006 | B2 | 5/2005 | Drake, III | |
| 6,973,693 | B1 | 12/2005 | Mayer et al. | 14/71.3 |
| 7,055,859 | B2 * | 6/2006 | Peveler | 280/766.1 |
| 7,073,763 | B1 * | 7/2006 | Trout | 248/352 |
| 7,128,330 | B2 | 10/2006 | Krauss | 280/456.1 |
| 7,140,157 | B2 * | 11/2006 | Oliver et al. | 52/292 |
| 7,188,842 | B2 | 3/2007 | Thorpe | |
| 7,338,052 | B2 | 3/2008 | Hanscom | |
| 2002/0117831 | A1 | 8/2002 | Ahlquist et al. | |
| 2005/0110260 | A1 | 5/2005 | Jacques | |
| 2006/0017241 | A1 | 1/2006 | Hanscom | |
| 2006/0081755 | A1 | 4/2006 | Thorpe | |
| 2006/0163858 | A1 | 7/2006 | Giralde | |
| 2006/0214390 | A1 | 9/2006 | Pinnell, III | 280/475 |
| 2007/0040370 | A1 * | 2/2007 | Hanscom | 280/763.1 |
| 2007/0114734 | A1 | 5/2007 | Jacques | 280/6.153 |
| 2007/0221900 | A1 | 9/2007 | Giralde | |
| 2008/0217898 | A1 | 9/2008 | Hanscom | |

* cited by examiner

TRAILER STABILIZING DEVICE AND METHOD OF USING SAME

CROSS-REFERENCE TO RELATED APPLICATION

This is a continuation-in-part of U.S. application Ser. No. 10/899,921 filed on Jul. 26, 2004, for which the inventor claims domestic priority.

BACKGROUND OF THE INVENTION

The present invention generally relates to trailer stabilizing devices and more specifically to devices and methods which allow a person to stabilize a trailer with stabilizing members which allow the trailer to be transported without removal of the stabilizing members.

A variety of different stabilizers are known for supporting stationary trailers, which stabilize the trailer and reduce movement of the trailer as people move within the trailer, thus making the trailer more comfortable for the occupants. Many of the known stabilizers must be installed after the trailer is set in place, requiring the positioning and installation of heavy pieces of equipment. Other known stabilizers are complicated, requiring crossing stabilizing bars or other elaborate supports. These stabilizers often are usually used in combination with the support legs usually attached to the bottom of the trailer.

Many trailers, including fifth wheel trailers, utilize ground-engaging support legs at the front of the trailer to support the trailer when the trailer is disengaged from the towing vehicle. Jack stands or landing gear attached to the bottom of the trailer are one type of commonly used ground-engaging support leg. The support legs of these devices may comprise a pair of telescoping members—the upper member and the lower member—which are telescoped with respect to each other by mechanical, hydraulic or electric means. However, because the stroke length may be limited, many of these devices comprise a drop tube member or extension which manually "drops" out of the lower member allowing additional length of the support leg, such that the end of the drop tube member reaches the ground. The end of the drop-tube member may comprise a ground-engaging base plate. The drop tube member is typically held in place using a pin which is inserted through holes in the lower member and corresponding holes in the drop tube member.

When a user desires to move the trailer, it is necessary to raise the ground-engaging base plate from the ground by raising the drop tube member back into the lower member. Depending upon its length and the configuration of any base plate which may be attached to the end of the drop tube member, the drop tube member may be relatively heavy. Depending upon the ground conditions, the drop tube member or base plate may be muddy or dirty such that it is unpleasant for the user to place his or her hands about it to raise it. In addition, depending upon the configuration of the trailer, the user may have to crouch or assume an uncomfortable position to lift the drop tube member back into the lower member.

SUMMARY OF THE INVENTION

The apparatus and method disclosed herein address these problems. The disclosed apparatus may be affixed at various locations at the bottom of a trailer and left attached when the trailer is being transported. The apparatus is relatively simple, and does not require crossed stabilizing bars. An embodiment of the apparatus comprises attachment brackets for the stabilizing bars which attachment brackets have selectively engaging lock mechanisms for restraining the stabilizing bar with respect to the attachment bracket. An embodiment of the apparatus may further comprise a modified base plate, to which stabilizing bars may be attached, to provide greater stability when the ground surface is uneven or unconsolidated. Yet another embodiment of the apparatus provides means for mechanically raising the drop leg of the landing gear and the attached base plate.

The trailer for which the present invention is directed is of the type having a top and a bottom defining a vertical axis, a front and a back defining a longitudinal axis, a first side and a second side defining a transverse axis perpendicular to the longitudinal axis, and ground engaging wheels attached to the bottom. One embodiment of the device comprises a adjustable length leg member. The adjustable length leg member may comprise landing gear or support legs which existed on the trailer at the time of purchase, or the adjustable length leg member may comprise devices which are installed specifically as a component of the disclosed apparatus. For example, the adjustable length leg members may comprise various types of jacks which are attached to the bottom of the trailer.

The disclosed apparatus further comprises a ground engaging base plate which is attached to the end of the adjustable length leg member. The ground engaging base plate comprises attachment means for one or more stabilizer members. The stabilizing member comprises a first end and a second end. The first end comprises means for attachment to the ground engaging base plate. The second end of the stabilizing member attaches to an attachment member which, in turn, is attached to the bottom of the trailer. The attachment member is adapted to slidably receive the second end of the stabilizing member, thereby allowing the effective length of the stabilizer to change.

The attachment member comprises locking means for engaging the stabilizing member and locking the stabilizing member with respect to the attachment member. The locking means allows the length of the stabilizing member disposed between the ground engaging base plate and the attachment member to be adjusted and locked as desired to increase the stability of the trailer. The locking means may be disengaged to allow the raising of the adjustable length leg member and the attached ground engaging base plate. It is to be appreciated that the straight-line distance between the ground engaging base plate and the attachment member is diminished as the ground engaging base plate is raised toward the bottom of the trailer. Therefore, the stabilizing member must slide with respect to the attachment member to allow the raising of the adjustable length leg member.

Another embodiment of the device comprises a drop leg lifting means for affixing to the upper member of the adjustable length leg member. Among other devices, the drop leg lifting means may comprise either a cable winch or ratchet strap attached to the upper member by means of u-shaped bracket. The end of the cable or strap is attached to either the ground engaging base plate or to the drop leg. The winch or ratchet strap may be used to assist in raising the drop tube into the lower member or, if desired, lower the drop tube to the ground in a controlled manner rather than simply allowing the drop tube to fall until the base plate engages the ground.

DETAILED DESCRIPTION OF THE EMBODIMENTS

Figure 1:
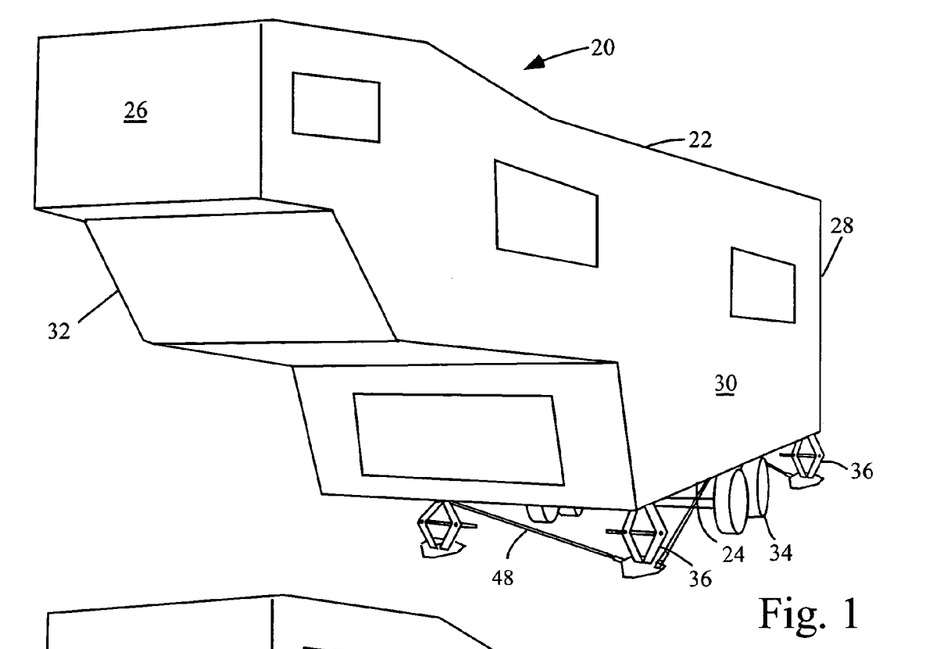
FIG. 1 is a schematic of a trailer, showing how one embodiment of the device may be installed.

Referring now specifically to the drawings, FIG. 1 shows a schematic of a trailer 20 with an embodiment of the stabilizing device installed. The trailer 20 is of the type having a top 22 and a bottom 24 defining a vertical axis, a front 26 and a back 28 defining a longitudinal axis, a first side 30 and a second side 32 defining a transverse axis perpendicular to the longitudinal axis, and ground engaging wheels 34 attached to the bottom 24. As shown in FIG. 1, scissor jacks 36 may be a component of this embodiment. Many trailers 20 come pre-equipped with leveling mechanisms of various types, including scissor jacks 36, which are attached to the bottom 24 of the trailer 20. Other leveling mechanisms may include mechanically, hydraulically, pneumatically, and electrically actuated jacks. The leveling mechanisms are employed to bring the trailer to a relatively level orientation for the comfort of those inside. However, the leveling mechanisms are generally not sufficient on their own to prevent excessive motion of the trailer 20 as people move about inside. Embodiments of the present stabilizing device may incorporate various leveling mechanisms, including those listed above, to improve the stability of the trailer.

Figure 2:
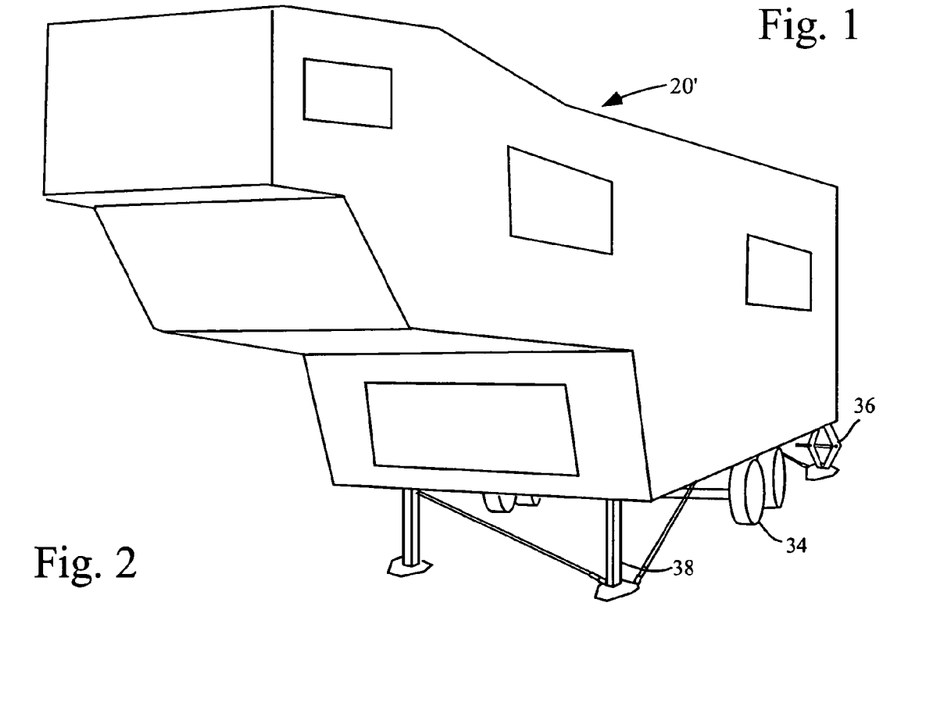
FIG. 2 is a schematic of a trailer, showing how a second embodiment of the device may be installed.

FIG. 2 shows a schematic of a trailer 20' which utilizes a landing gear 38 to support the front 26 of the trailer. As shown in FIG. 2, embodiments of the disclosed stabilizing device may work in combination with landing gear 38. As shown in FIG. 2, trailer 20' may still utilize a combination of embodiments of the device, according to the configuration of a particular trailer. For example, FIG. 2 shows an embodiment of the device utilizing landing gear at the front 26 of the trailer 20' while a different embodiment may utilize scissor jacks 36 or other type of jack. It is to be appreciated that a jack, including scissor jack 36, and/or landing gear 38 may comprise what is referred to herein as an adjustable length leg member.

Figure 3:
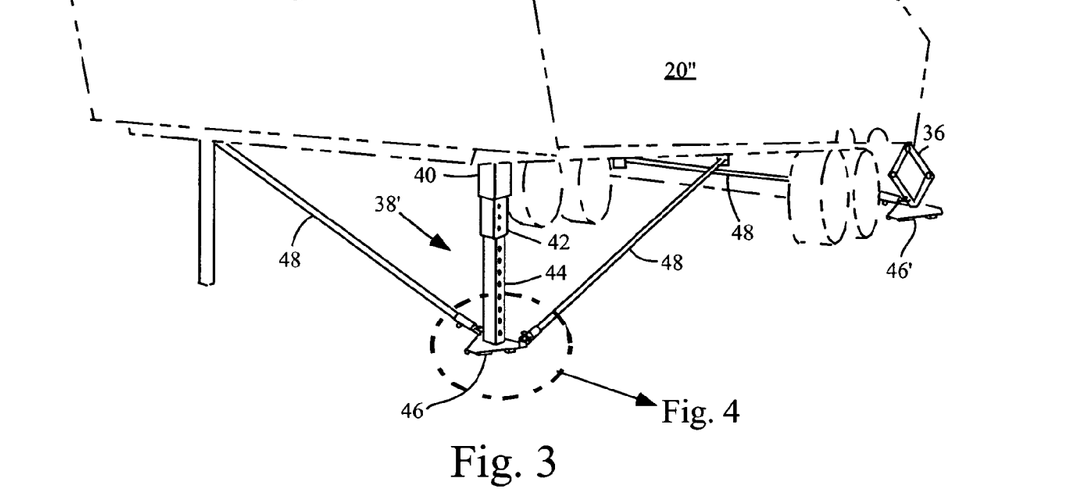
FIG. 3 is a schematic of a trailer, showing how a third embodiment of the device may be installed.
Figure 4A:
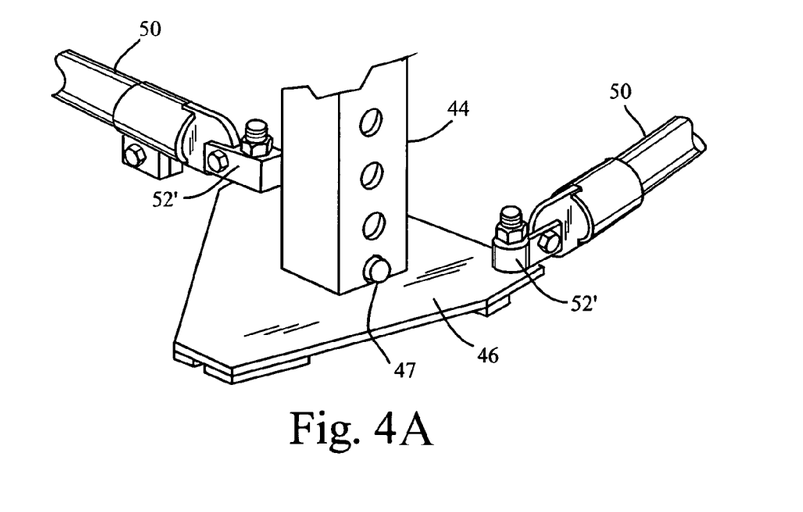
FIG. 4A is a close up view of an embodiment of a ground engaging base plate of FIG. 3 which may be used for attaching one or more stabilizing members.
Figure 4B:
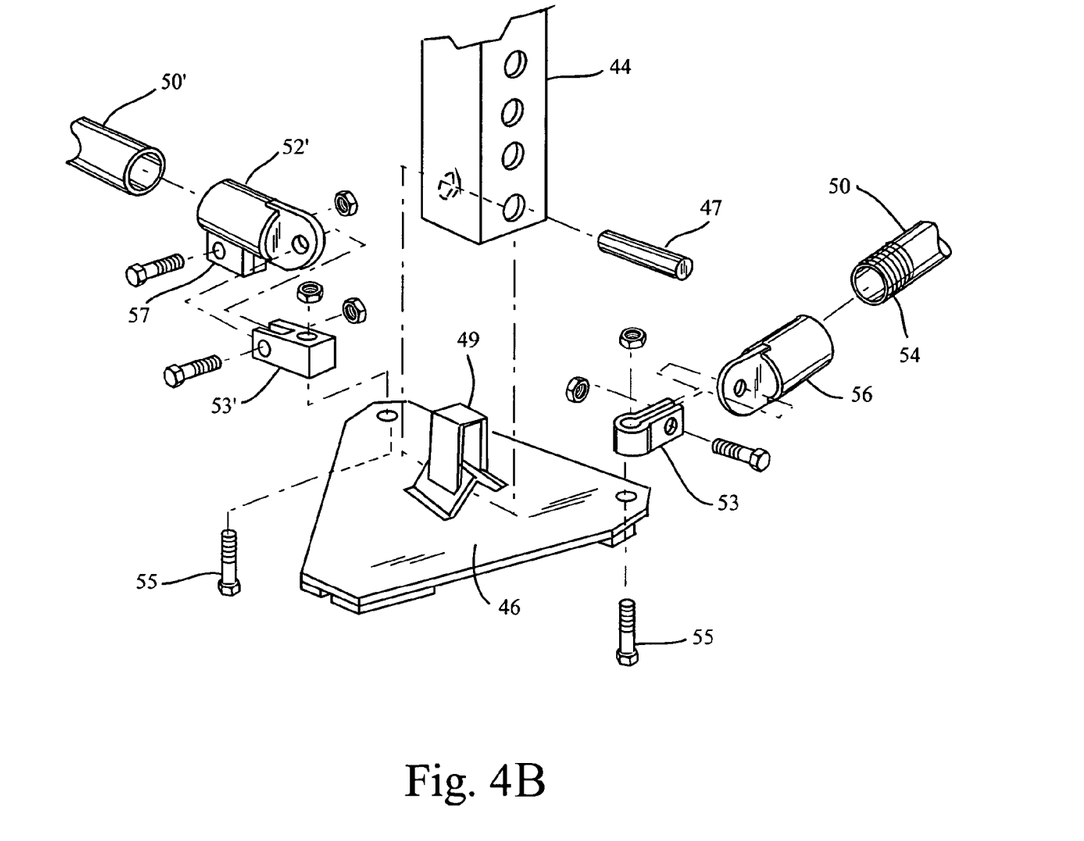
FIG. 4B is an exploded view of the ground engaging base plate of FIG. 2.

FIG. 3 shows a schematic of a trailer 20" which utilizes telescoping landing gear 38'. Telescoping landing gear 38' comprises adjustable length leg members, each having an upper member 40 and a lower member 42 which extends, telescopically, from the upper member 40. Lower member 42 may be extended or retracted by mechanical, hydraulic or electric means. Lower member 42 may also comprise drop tube member 44. Drop tube member 44 is an extension which manually "drops" out of lower member 42 when a pin, retaining clip or other securing device is manipulated. Drop tube member 44 provides additional length to the adjustable length leg member, such that the end of the drop tube member reaches the ground. The end of the drop-tube member 44 may comprise a ground engaging base plate 46. The drop tube member is typically held in place using a pin which is inserted through holes in the lower member and corresponding holes in the drop tube member. The ground engaging base plate 46 may attach to the end of drop tube member with a pin or fastener 47 which engages base plate extension 49, as shown in FIG. 4B.

Ground engaging base plate 46 comprises attachment means for one or more stabilizing members 48. The stabilizing member comprises a first end 50 and a second end 52. The first end 50 attaches to the ground engaging base plate 46. As shown in greater detail in FIG. 4A and FIG. 5A, ground engaging base plate 46 may comprise attachment brackets 53, 53'. Attachment bracket 53 may be attached to ground engaging base plate 46 with fastener 55. First end 50 may comprise threads 54. Alternatively, first end 50' may comprise a plain end. First end 50 may pivotally attach to attachment bracket 53 with end piece 56, which has internal threads to match threads 54. Alternatively, first end 50' may pivotally attach to mounting bracket 53' which utilizes a compression clamp 57 to attach the mounting bracket 53' to first end 50'. It is to be appreciated that either type of connector may be used exclusively to pivotally attach the stabilizing members 48 to the ground engaging base plate 46.

Figure 7:
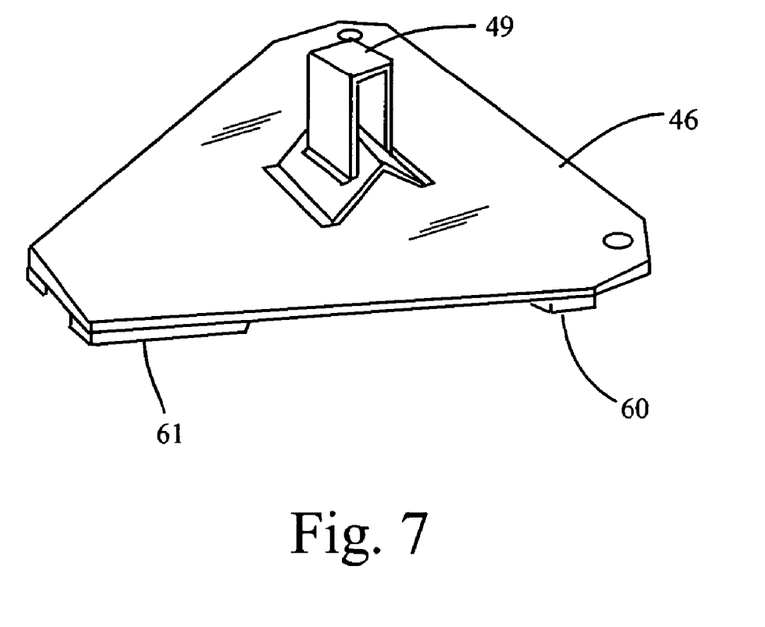
FIG. 7 shows a perspective view of an embodiment of a ground engaging base plate which may be utilized with the disclosed apparatus.
Figure 8:
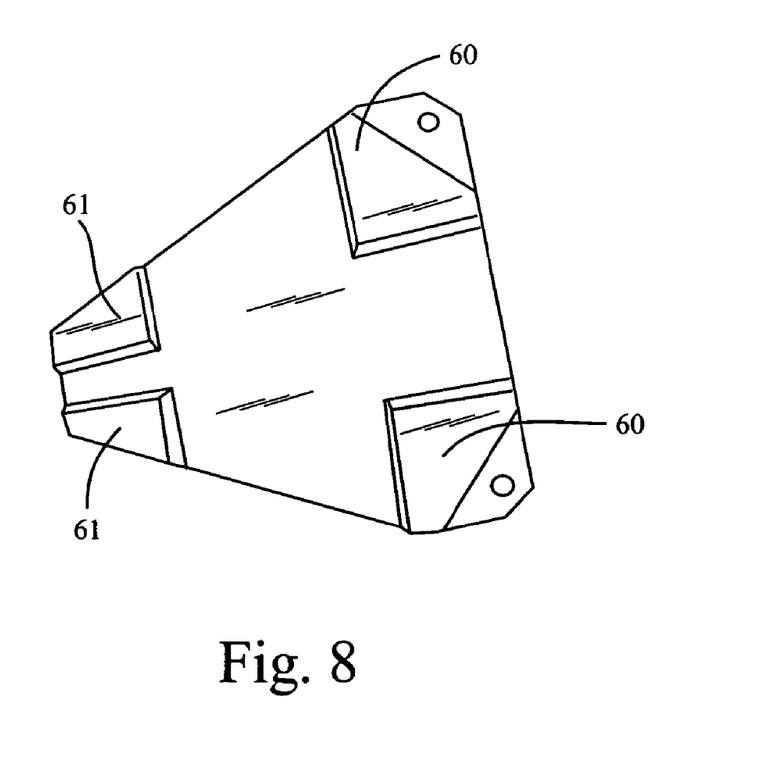
FIG. 8 shows a bottom view of the ground engaging base plate of FIG. 7.
Figure 9:
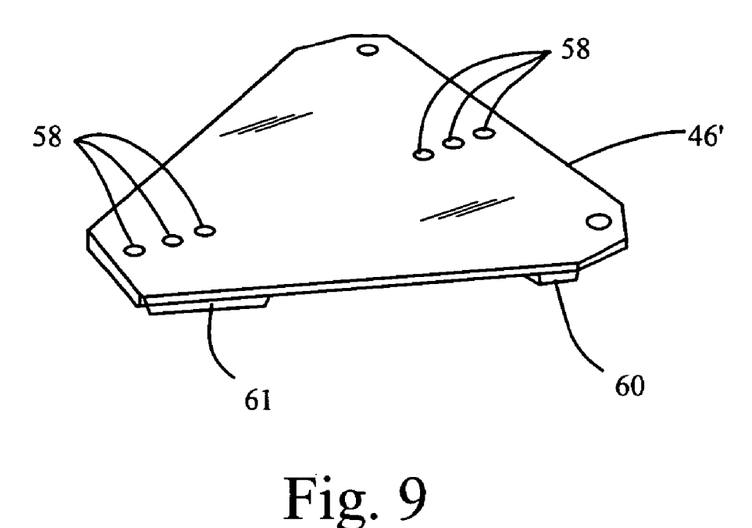
FIG. 9 shows a perspective view of another embodiment of a ground engaging base plate which may be utilized with the disclosed apparatus.
Figure 10:
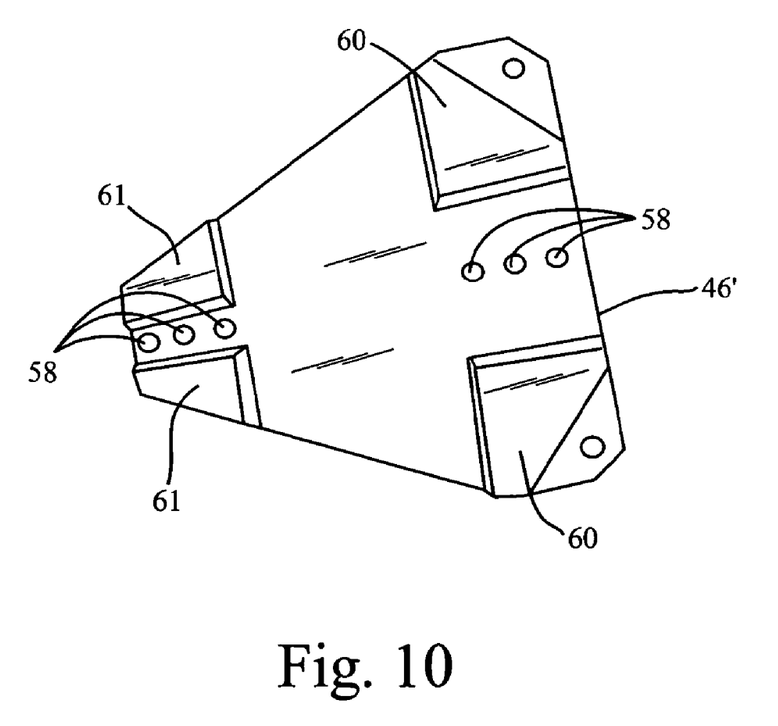
FIG. 10 shows a bottom view of the ground engaging base plate of FIG. 9.

FIGS. 7 through 10 show embodiments of ground engaging base plate 46, 46' which may be utilized with different embodiments of the disclosed apparatus. FIGS. 7 and 8 depict a base plate 46 which may be used with either fixed length or adjustable length leg members of a landing gear 38, 38' type support, as shown in FIGS. 2 and 3, while FIGS. 9 and 10 depict a ground engaging base plate 46' which may be used with the adjustable length leg member of a jack stand or scissor jack. Ground engaging base plate 46 comprises base plate extension 49 which extends up into the drop tube member 44 or other portion of the adjustable length leg member of the landing gear 38. However, the ground engaging base plate 46' shown in FIGS. 9 and 10 is configured to attach to a scissor jack 36, which is bolted to the base plate 46' utilizing holes 58. Base plate extension 49 is not required for this embodiment of the ground engaging base plate 46'.

Both embodiments of the ground engaging base plate 46, 46' may comprise ground engaging foot members 60, 61. Ground engaging foot members 60, 61 allow ground engaging base plate 46, 46' to have increased stability on uneven or unconsolidated ground surfaces. As shown in FIG. 8, the foot members 60, 61 may be disposed in a generally triangular configuration, with two larger triangular pads 60 at the rear of the base plate 46, 46' and either one or two smaller pads 61 located at the front end of the base plate. This general configuration of ground engaging foot members 60, 61 allow the ground engaging base plate 46, 46' to be self-leveling and thereby more stable.

Figure 5A:
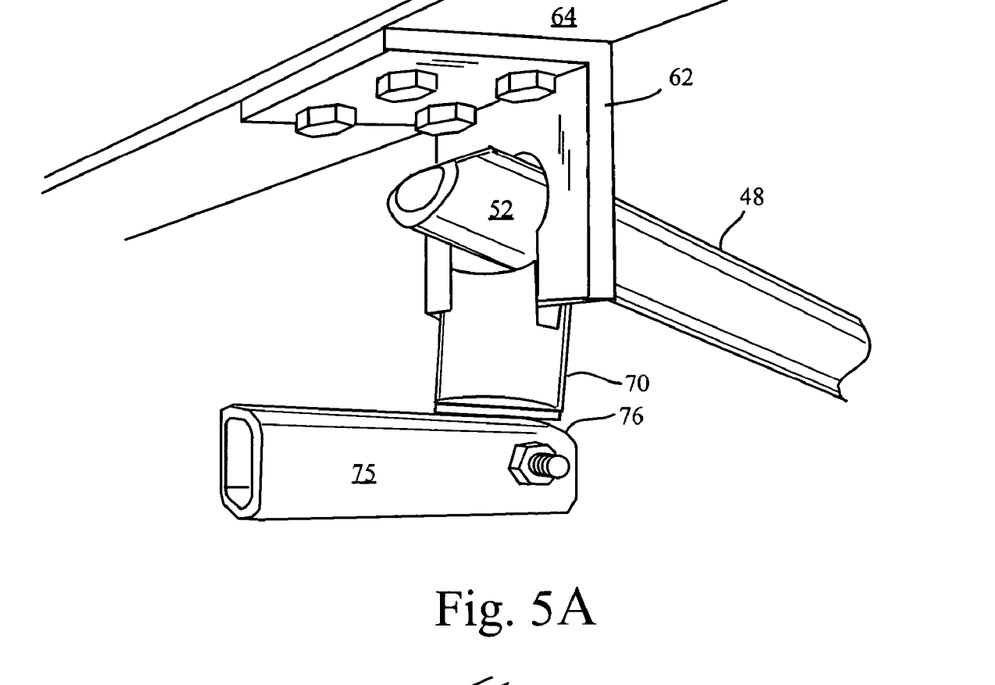
FIG. 5A shows a close up view of an embodiment of an attachment member which may be used for attaching an end of a stabilizing member to the chassis of a trailer.
Figure 5B:
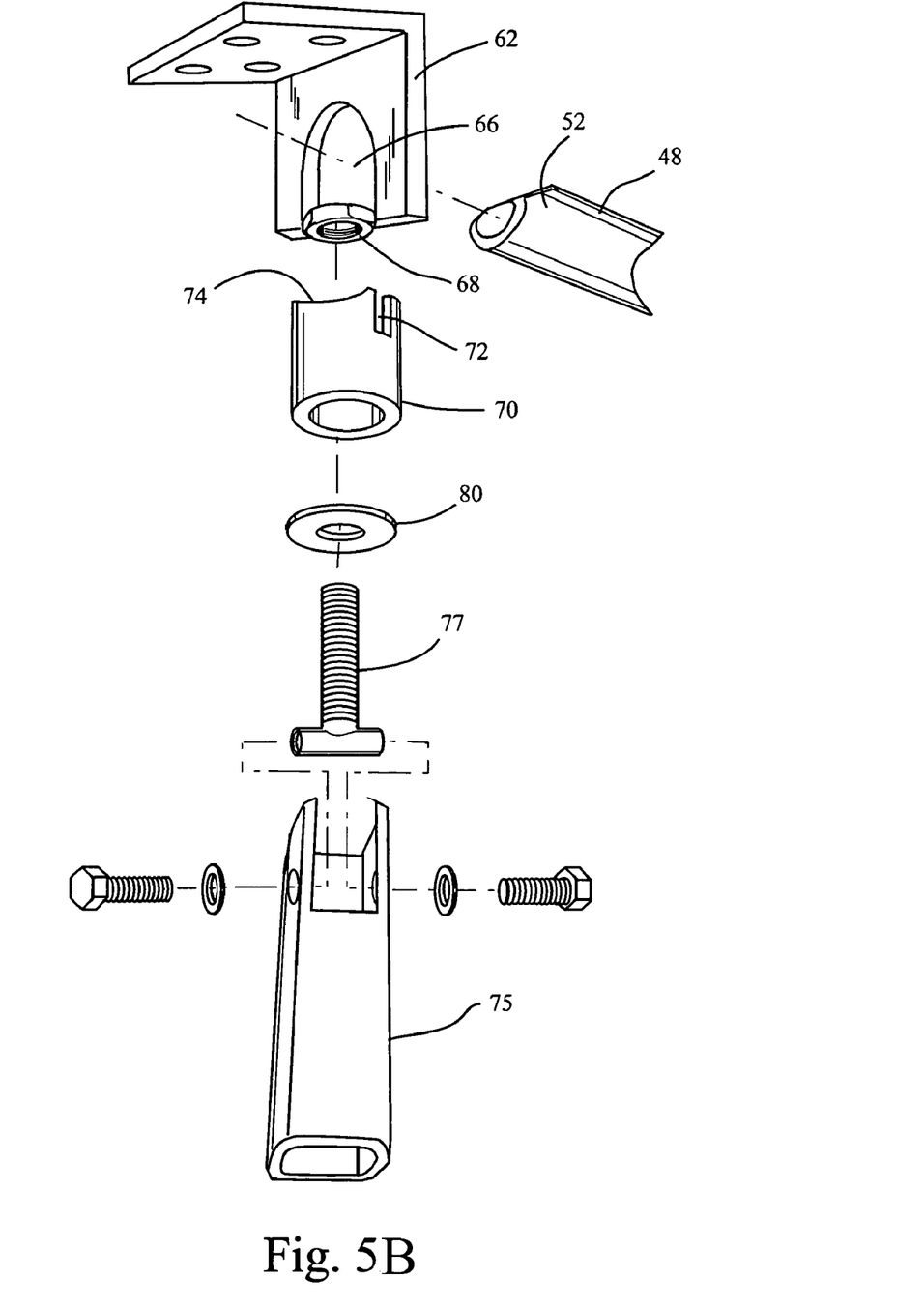
FIG. 5B shows an exploded view of the attachment member of FIG. 5A.
Figure 6A:
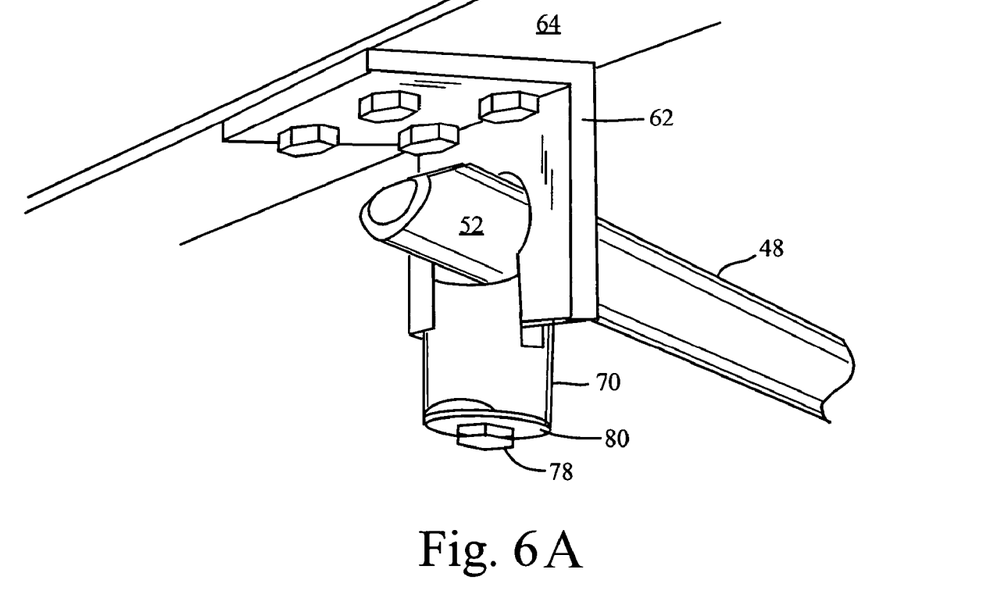
FIG. 6A shows a close up view of another embodiment of an attachment member which may be used for attaching an end of a stabilizing member to the chassis of a trailer.
Figure 6B:
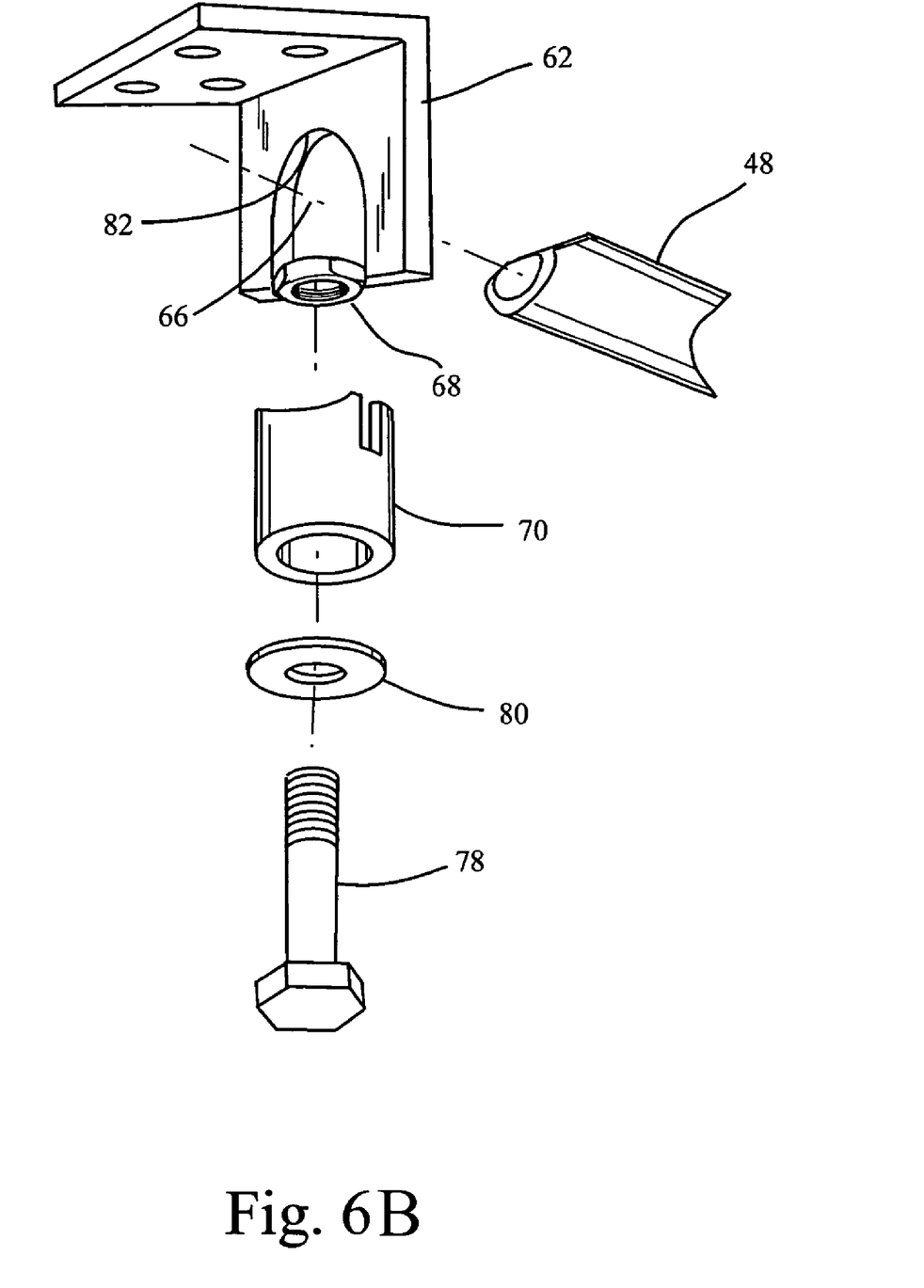
FIG. 6B shows an exploded view of the attachment member of FIG. 6A.

The second end 52 of stabilizing member 48 attaches to attachment member 62 which attaches to a structural member 64 or other suitable attachment point at the bottom 24 of the trailer 20. As shown in the embodiments depicted in FIGS. 5-6, attachment member 62 is adapted to slidably receive the second end 52 of the stabilizing member 48. As shown in FIG. 5B, attachment member 62 comprises an opening 66 which is sufficiently large to receive the second end 52 of the stabilizing member 48. As shown in FIGS. 5-6, selective locking means engage the stabilizing member 48. The selective locking means allow the user to position the stabilizer as desired with respect to the attachment member 62 by causing the stabilizing member 48 to slide through the opening 66 as the adjustable length leg member is set in the desired position and the ground engaging base plate 46 is set upon the ground. Once the adjustable length leg member is set in the desired position and the ground engaging base plate 46 set upon the ground, the selective locking means are activated such that the stabilizing member 48 is locked in place with respect to attachment member 62, thus providing a fixed support extending between the base plate and the bottom 24 of the trailer 20. As show in FIGS. 5-6, the selective locking means acts upon the stabilizing member 48 at the periphery of opening 62.

As shown in greater detail in FIGS. 5B and 6B, attachment member 62 comprises a threaded aperture such as a nut 68 which partially bounds opening 66. It is to be appreciated that the threaded aperture might also be formed as an integral part of attachment member 62 in contrast to using a discrete device such as nut 68. The threaded aperture is generally normal to the opening 66, such that the threaded fastener made up into the threaded aperture will be at an angle approaching 90 degrees with respect to stabilizing member 48.

FIGS. 5A and 5B show one type of selective locking means which may be utilized for the disclosed stabilizing device. The selective locking means may comprise a sleeve member 70. As shown in greater detail in FIG. 5B, sleeve member 70 comprises a generally cylindrical member having slots 72 on either side of the sleeve. Slots 72 are configured to fit over the lower portion of attachment member 62. Sleeve member 70 has a diameter sufficiently large to slide over nut 68. If stabilizing member 48 is in a round configuration, such as that indicated in the figures herein, the upper end 74 of sleeve member 70 may be contoured to increase the contact surface between the stabilizing member 48 and sleeve member 70. It is to be appreciated that other shapes of stabilizing member 48 may be utilized, such as oval, elliptical, or square, without changing the functioning of the disclosed device.

FIGS. 5A and 5B show one embodiment of the selective locking means which utilizes a handle member 75 to urge the sleeve member 70 against the side of stabilizing member 48. The locking means further comprises a threaded fastener 77 pivotally attached to the handle member. The handle member 72 further comprises a cam surface 76 which engages sleeve member 70. As shown in FIG. 5A, when handle member 72 is rotated from a horizontal to vertical position, cam surface 76 rotates and urges sleeve member 70 upwardly, thereby engaging stabilizing member 48 and locking it into position.

FIGS. 6A and 6B show another embodiment of the selective locking means. In this embodiment sleeve member 70 is urged upwardly against the side of stabilizing member 48 by fastener 78. Washer 80 may be utilized for engaging the bottom of sleeve member 70. In this embodiment, stabilizing member 48 is locked into position with respect to attachment member 62 by fastener 78 being made up into the threaded aperture, such as nut 68. As fastener 78 is made up into the threaded aperture, the stabilizing member 48 is sandwiched between the upper boundary 82 of opening 66 and sleeve member 70. Moreover, fastener 78 may also engage stabilizing member 48.

Figure 11:
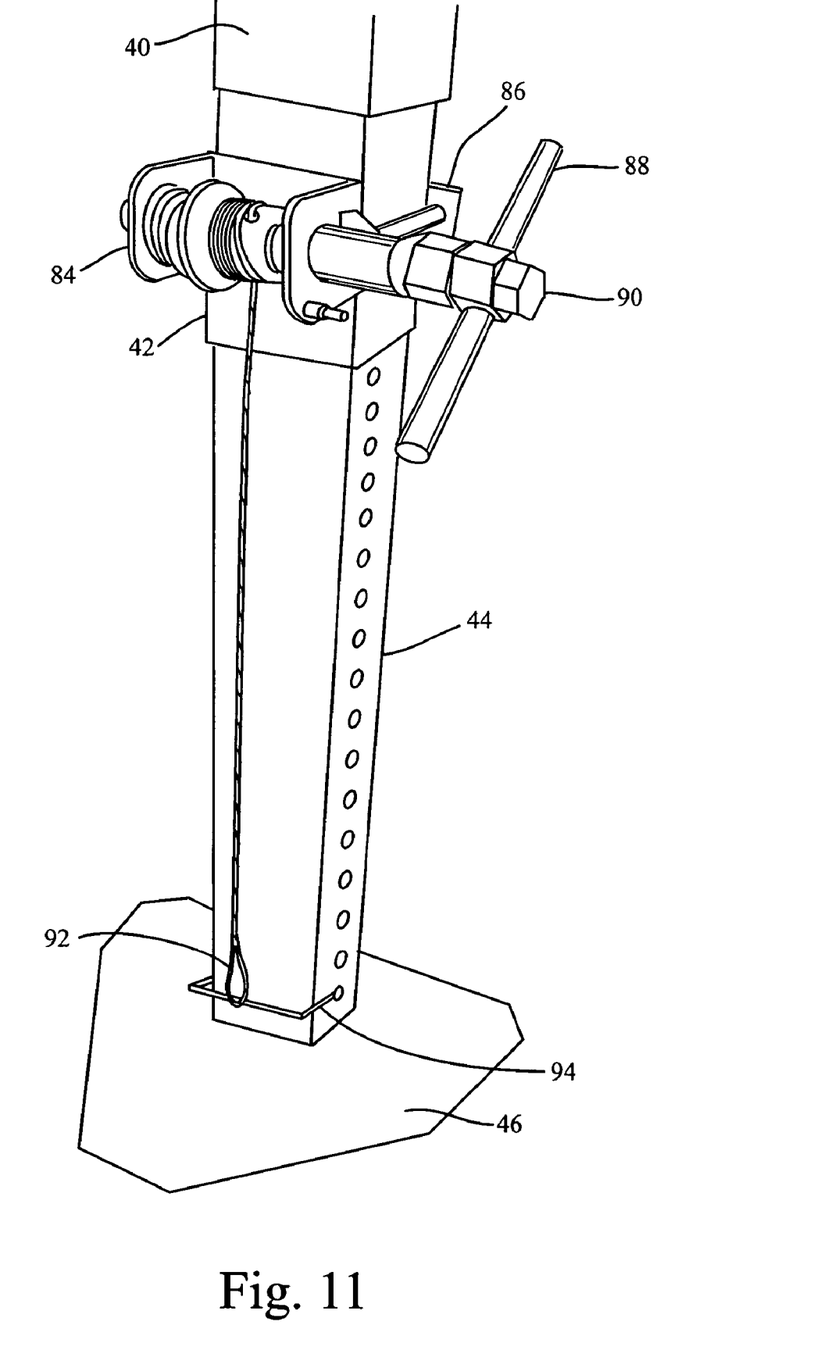
FIG. 11 shows how a winch may be attached to an adjustable length leg member to provide drop leg lifting means.
Figure 12:
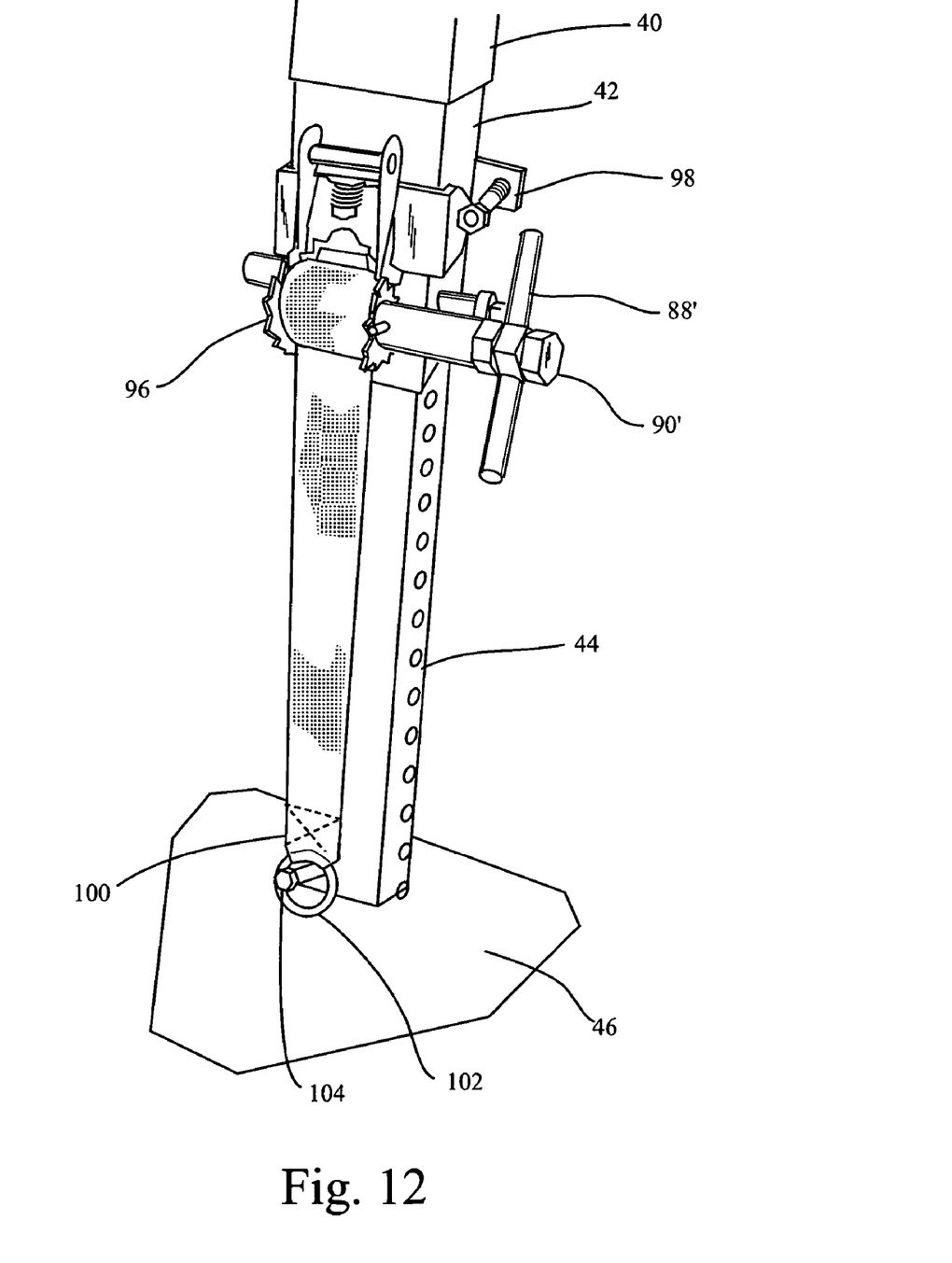
FIG. 12 shows how a strap ratchet may be attached to an adjustable length leg member to provide drop leg lifting means.

FIGS. 11 and 12 depict different means which may be employed as lifting means for drop leg 44. The lifting means are attached to either upper member 40 or to lower member 42. FIG. 11 shows a cable winch 84 which is shown attached to lower member 42 with bracket 86. Cable winch 84 may be rotated using handle 88. Alternatively, an extended reach handle may utilized which handle has a socket adapted to engage hex head 90. Cable end 92 is attached to drop leg 44 or to ground engaging base plate 46. For example, a lifting bracket 94 may be attached to drop leg 44 as shown in FIG. 11. Additional lifting means may also be employed to assist in raising drop leg 44. For example, a spring or elastic cord (not shown) may be disposed between lower member 42 and drop leg 44, such that the spring or elastic cord is stretched as the drop leg is dropped. It is be appreciated that the spring or elastic cord should be sized such that the weight of the drop leg is sufficient to overcome the spring resistance of the spring or cord. Such spring, elastic cord, or other additional lifting means may be attached inside lower member 42 and drop leg 44.

FIG. 12 shows a ratchet strap 96 which is shown attached to lower member 42 with bracket 98. Ratchet strap 96 may be rotated using handle 88'. As with cable winch 84, an extended reach handle may be utilized which handle has a socket adapted to engage hex head 90' Strap end 100 is attached to drop leg 44 or ground engaging base plate 46. For example, as shown in FIG. 12, lifting loop 102 may be attached to strap end 100, with the lifting loop attached to bolt 104 which is attached to drop leg 44.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. A device for stabilizing a stationary trailer, the trailer having a top and a bottom, the device comprising:
an adjustable length leg member attached to the bottom of the trailer;
a stabilizing member comprising a first end and a second end,
a ground engaging portion of the adjustable length leg member, the ground engaging portion comprising an attachment component which pivotally connects the first end of the stabilizing member to the portion of the adjustable length leg member; and
an attachment member comprising a portion thereof directly attached to the bottom of the trailer, the attachment member having another portion thereof in the form of an opening configured to slideably receive the second end of the stabilizing member;
the attachment member further comprises selective locking means for engaging the stabilizing member at a desired location along the length of the stabilizing member and for fixedly securing the stabilizing member in place by abutting the desired location of the stabilizing member against an inner surface of the opening thus restraining axial motion of the stabilizing member.

2. The device of claim 1 wherein the adjustable length leg member comprises a jack.

3. The device of claim 2 wherein the ground engaging base plate comprises a plurality of ground engaging foot members extending from the bottom of the base plate.

4. The device of claim 3 wherein the ground engaging foot members are disposed on the bottom of the ground engaging base plate in a generally triangular configuration.

5. The device of claim 1 wherein the adjustable length leg member comprises a leg of the trailer's landing gear.

6. The device of claim 1 wherein the selective locking means engages the stabilizing member along the periphery of the opening.

7. The device of claim 6 wherein the attachment member further comprises a threaded aperture, the aperture generally normal to the opening of the attachment member and a threaded fastener extending through the threaded aperture.

8. The device of claim 7 wherein the selective locking means comprises a sleeve member which engages the stabilizing member as a lock member is urged against the sleeve member, the lock member comprising a handle member and a threaded fastener pivotally attached to the handle member, the handle member further comprising a cam surface for engaging the sleeve member.

9. The device of claim 1 wherein the selective locking means comprises a threaded fastener extending through a threaded aperture.

10. The device of claim 9 wherein the selective locking means further comprises a sleeve member which engages the stabilizing member as the threaded fastener is moved up into the threaded aperture.

11. The device of claim 10 wherein the portion of the adjustable length leg member comprises a base plate.

12. The device of claim 1 wherein the portion of the adjustable length leg member comprises a base plate.

13. A device for stabilizing a stationary trailer, the trailer having a top and a bottom, the device comprising:
   an adjustable length leg member at the bottom of the trailer, the adjustable length leg member comprising a drop-tube member;
   a stabilizing member comprising a first end and a second end,
   a ground engaging portion of the adjustable length leg member, the ground engaging portion comprising an attachment component which pivotally connects the first end of the stabilizing member to the portion of the adjustable length leg member; and
   an attachment member comprising a portion thereof directly attached to the bottom of the trailer, the attachment member having another portion thereof in the form of an opening configured to slideably receive the second end of the stabilizing member;
   the attachment member further comprises selective locking means for engaging the stabilizing member at a desired location along the length of the stabilizing member and for fixedly securing the stabilizing member in place by abutting the desired location of the stabilizing member against an inner surface of the opening thus restraining axial motion of the stabilizing member.

14. The device of claim 13 further comprising a cable winch attached to the adjustable length leg member, the cable winch having a cable with one end attached to the drop leg member.

15. The device of claim 13 further comprising a ratchet strap attached to the adjustable length leg member, the ratchet strap having a strap with one end attached to the drop leg member.

16. The device of claim 13 wherein the attachment member comprises a threaded aperture, the aperture generally normal to an opening of the attachment member and a threaded fastener extending through the threaded aperture.

17. The device of claim 16 wherein the selective locking means comprises a sleeve member which engages the stabilizing member as the threaded fastener is moved up into the threaded aperture.

18. The device of claim 16 wherein the selective locking means further comprises a sleeve member which engages the stabilizing member as a lock member is urged against the sleeve member, the lock member comprising a handle member and a threaded fastener pivotally attached to the handle member, the handle member further comprising a cam surface for engaging the sleeve member.

19. The device of claim 13 wherein the portion of the adjustable length leg member comprises a base plate.

20. The device of claim 19 wherein the ground engaging base plate comprises a plurality of ground engaging foot members extending from the bottom of the base plate.

21. The device of claim 20 wherein the ground engaging foot members are disposed on the bottom of the ground engaging base plate in a generally triangular configuration.

22. The device of claim 19 wherein the ground engaging base plate comprises a plurality of ground engaging foot members extending from the bottom of the base plate.

23. A stabilizing system for stabilizing a stationary trailer, the trailer having a top and a bottom defining a vertical axis, a front and a back defining a longitudinal axis, a first side and a second side defining a transverse axis perpendicular to the longitudinal axis, stabilizing system comprising:
   a first adjustable length leg member and a second adjustable length leg member attached to the bottom of the trailer;
   a first stabilizing member, a second stabilizing member and a third stabilizing member, each stabilizing member comprising a first end and a second end,
   a first ground engaging base plate adjacent to an end of the first adjustable length leg member and a second ground engaging base plate adjacent to an end of the second adjustable length leg member;
   the first ground engaging base plate further comprising attachment means for pivotally connecting the first ends of the first stabilizing member and the second stabilizing member to the first ground engaging base plate;
   the second ground engaging base plate further comprising attachment means for pivotally connecting the first end of the third stabilizing member to the second ground engaging base plate; and
   a first attachment member, a second attachment member, and a third attachment member, each respectively attached directly to the bottom of the trailer, each attachment member having a portion thereof in the form of an opening configured to slideably receive the the second ends of the first stabilizing member, the second stabilizing member, and the third stabilizing member, respectively, wherein each attachment member further comprises selective locking means for engaging the respective stabilizing members at a desired location along the length of the stabilizing member and for fixedly securing respective stabilizing members in place by abutting the desired location of the stabilizing member against an inner surface of the opening thus restraining axial motion of the stabilizing members, and the stabilizing members are oriented such that the first stabilizing member and the third stabilizing member are oriented along the longitudinal axis of the trailer and the second stabilizing member is oriented along the transverse axis of the trailer.

24. The device of claim 23 further comprising a cable winch attached to the first adjustable length leg member, the cable winch having a cable with one end attached to the drop leg member.

25. The device of claim 23 further comprising a ratchet strap attached to the first adjustable length leg member, the ratchet strap having a strap with one end attached to the drop leg member.

26. The device of claim 23 wherein at least one attachment member comprises a threaded aperture, the aperture generally normal to an opening of the at least one attachment member and a threaded fastener extending through the threaded aperture.

27. The device of claim 26 wherein the selective locking means further comprises a sleeve member which engages the stabilizing member as the threaded fastener is moved up into the threaded aperture.

28. The device of claim 26 wherein the selective locking means comprises a sleeve member which engages the stabilizing member as a lock member is urged against the sleeve member, the lock member comprising a handle member and a threaded fastener pivotally attached to the handle member, the handle member further comprising a cam surface for engaging the sleeve member.

29. The device of claim 23 wherein the ground engaging base plate comprises a plurality of ground engaging foot members extending from the bottom of the base plate.

30. The device of claim 29 wherein the ground engaging foot members are disposed on the bottom of the ground engaging base plate in a generally triangular configuration.

31. A device for stabilizing a stationary trailer, the trailer having a top, a bottom, and at least one adjustable length leg member, the device comprising:
   a stabilizing member comprising a first end and a second end;
   a ground engaging portion of the adjustable length leg member, the ground engaging portion comprising an attachment component which pivotally connects the first end of the stabilizing member to the portion of the adjustable length leg member; and
   an attachment member comprising a portion thereof directly attached to the bottom of the trailer, the attachment member having another portion thereof in the form of an opening configured to slideably receive the second end of the stabilizing member;
   the attachment member further comprises selective locking means for engaging the stabilizing member at a desired location along the length of the stabilizing member and for fixedly securing the stabilizing member in place by abutting the desired location of the stabilizing member against an inner surface of the opening thus restraining axial motion of the stabilizing member.

32. The device of claim 31 wherein the selective locking means engages the stabilizing member along the periphery of the opening.

33. The device of claim 32 wherein the selective locking means comprises a threaded fastener extending through a threaded aperture.

34. The device of claim 31 wherein the portion of the adjustable length leg member comprises a base plate.

35. A method of stabilizing a trailer, the trailer having at least one adjustable length leg member attached to a bottom of the trailer, at least one adjustable stabilizing member, the at least one adjustable stabilizing member being pivotally connected to the at least one adjustable leg member and directly to the bottom of the trailer, the method comprising the steps of:
   stopping the trailer from moving;
   lowering the at least one adjustable length leg member which in turn lowers the at least one adjustable stabilizing member;
   adjusting the length of the at least one adjustable length leg member;
   adjusting the length of the one adjustable stabilizing member;
   securing the at least one adjustable length leg member with respect to the bottom of the trailer;
   securing the at least one adjustable length leg member and the at least one adjustable stabilizing member with respect to the bottom of the trailer by locking the at least one adjustable stabilizing member with respect to an attachment member by abutting a desired location of the at least one stabilizing member against an inner surface of an opening in the attachment member in order to maintain the trailer in a stable condition with respect to ground.

36. The method of stabilizing a trailer of claim 35 further comprising another adjustable stabilizing member interconnected between the bottom of the trailer and a second adjustable length leg member, the method further comprising the steps of:
   lowering the second adjustable length leg member;
   lowering the another adjustable stabilizing member with the lowering of a second adjustable length leg member;
   securing the second adjustable length leg member with respect to the bottom of the trailer;
   securing the another adjustable stabilizing member with respect to the bottom of the trailer and the second adjustable length leg member;
   wherein two of the adjustable stabilizing members are oriented along a transverse axis of the trailer.

* * * * *